(12) United States Patent
Hayes

(10) Patent No.: US 6,179,182 B1
(45) Date of Patent: Jan. 30, 2001

(54) SPORT VEHICLE LUGGAGE BAG WITH COLLAPSIBLE BEVERAGE HOLDER

(75) Inventor: Christopher J. Hayes, Rockford, MI (US)

(73) Assignee: Specialty Sports Limited, Rockford, MI (US)

( * ) Notice: Under 35 U.S.C. 154(b), the term of this patent shall be extended for 0 days.

(21) Appl. No.: 09/368,677

(22) Filed: Aug. 5, 1999

(51) Int. Cl.$^7$ .................................................... B60R 9/06
(52) U.S. Cl. .................... 224/408; 62/457.5; 190/107; 190/111; 383/2; 383/110
(58) Field of Search ..................... 190/111, 107; 383/2, 110; 224/408; 62/457.4, 457.5

(56) References Cited

U.S. PATENT DOCUMENTS

| | | | |
|---|---|---|---|
| 3,785,541 | * | 1/1974 | Sibey .................................... 224/408 |
| 4,106,597 | * | 8/1978 | Shook et al. .......................... 190/111 |
| 4,258,869 | * | 3/1981 | Hilgendorff .......................... 224/408 |
| 4,361,215 | * | 11/1982 | Sawai ..................................... 383/2 |
| 4,537,313 | * | 8/1985 | Workman ............................. 383/110 |
| 4,773,515 | * | 9/1988 | Kotkins, Jr. .............................. 383/2 |
| 5,060,767 | * | 10/1991 | Pullichino, Jr. et al. ............. 190/111 |
| 5,403,095 | * | 4/1995 | Melk ..................................... 383/110 |
| 5,526,907 | * | 6/1996 | Trawick et al. ...................... 383/110 |
| 5,562,228 | * | 10/1996 | Ericson ................................ 383/110 |
| 5,746,364 | * | 5/1998 | Stengrim .............................. 224/408 |
| 5,901,571 | * | 5/1999 | Whaley ................................ 62/457.5 |
| 6,067,813 | * | 5/2000 | Smith ................................... 62/457.4 |
| 6,068,402 | * | 5/2000 | Freese et al. ............................ 383/2 |

* cited by examiner

Primary Examiner—Stephen P. Garbe
(74) Attorney, Agent, or Firm—Price, Heneveld, Cooper, DeWitt & Litton

(57) ABSTRACT

Luggage for a sports vehicle, such as a snowmobile, is provided with a collapsible beverage compartment to provide more convenient access to stored beverages, without detracting from the functional and esthetic aspects of the luggage when beverages are not being stored. The luggage includes a bag having a plurality of panels defining an enclosed space, at least one strap connected to the bag for securing the bag to a sports vehicle, a collapsible beverage compartment projecting from one of the panels of the bag, and a foam insert disposed within the collapsible beverage compartment, the foam insert defining at least one cylindrical storage space for holding a beverage can.

18 Claims, 2 Drawing Sheets

SPORT VEHICLE LUGGAGE BAG WITH COLLAPSIBLE BEVERAGE HOLDER

FIELD OF THE INVENTION

This invention relates to the field of sport vehicle luggage bags.

BACKGROUND OF THE INVENTION

Snowmobile trunk bags are relatively large bags which may be releasably secured to a rearward portion of a snowmobile to provide a large storage volume for carrying items which may be needed during a snowmobile trip, such as clothing, cameras, food, beverages, sporting equipment, etc. Such bags have been very popular for many years.

Although beverages may be stored in a conventional trunk bag along with various other items, many snowmobile enthusiasts would prefer to store their beverages in a more convenient location which is exclusively reserved for beverages so that access to the beverages is unfettered by other items which may have to be moved aside to reach the beverages. Also, many snowmobilers would prefer being able to remove their beverage from storage without having to dismount from the snowmobile and walk around to the back side of the snowmobile where the access panel or door on a conventional trunk bag is typically located.

Another disadvantage with storing beverages loosely in a trunk bag is that the beverages can roll around during operation of the snowmobile. This can cause the beverage containers to collide with and possibly damage other items such as cameras. Also, free movement of a loose beverage container containing a carbonated beverage can cause carbon dioxide to evolve from the liquid beverage and pressurize the air or head space in the can. If such a container is opened immediately after being agitated, the contents will be forcefully ejected from the container by the gas pressure.

SUMMARY OF THE INVENTION

The invention overcomes the problems of known luggage for a sports vehicle by providing a bag having a collapsible beverage compartment. The collapsible beverage compartment provides a convenient storage space designed exclusively for beverages so that access to the beverages is unfettered by other items which may otherwise have to be moved aside to reach the beverages.

In accordance with one aspect of the invention, the collapsible beverage compartment projects upwardly and forwardly from an upwardly and forwardly facing panel surface of the trunk bag so that a snowmobiler can easily reach stored beverages without dismounting from the snowmobile. The beverage compartment is collapsible to make the bag more compact when all of the beverages have been consumed, thus providing a more functional configuration and esthetically appealing appearance when the beverage compartment is not needed.

In accordance with another aspect of the invention, the collapsible beverage compartment includes a compressible foam insert which cushions the beverages against shock and vibration to reduce agitation of carbonated beverages, thereby reducing carbon dioxide evolution and pressurization of the air or head space in the can. The compressible foam insert also facilitates storage of beverages in a neat, organized manner, and provides thermal insulation.

DESCRIPTION OF THE PREFERRED EMBODIMENTS

Figure 1:
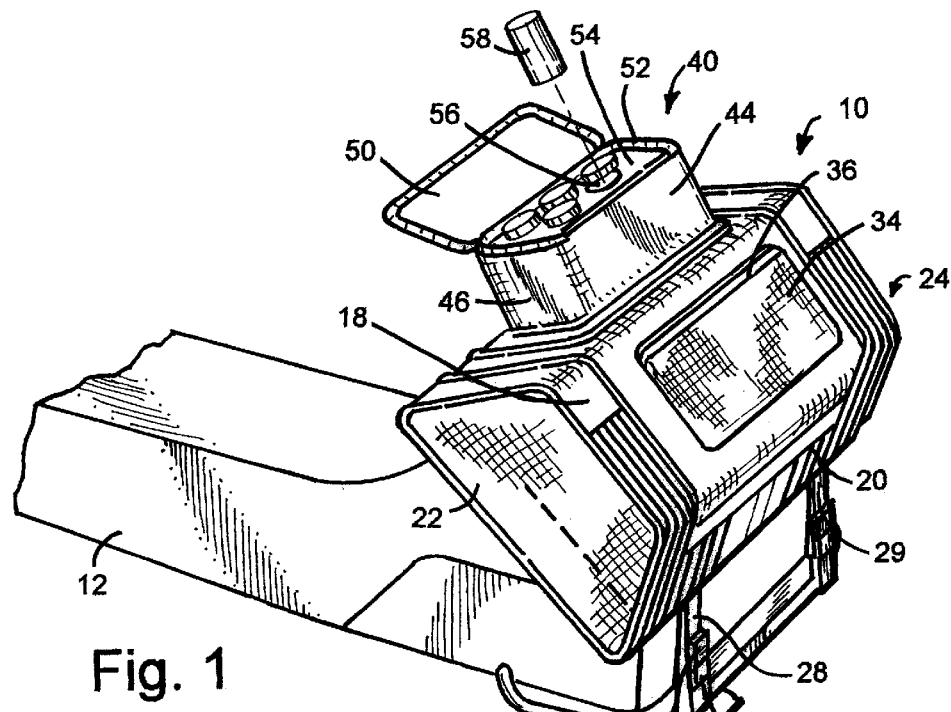
FIG. 1 is a rear perspective view of a snowmobile trunk bag having a collapsible beverage compartment in accordance with the invention.
Figure 2:
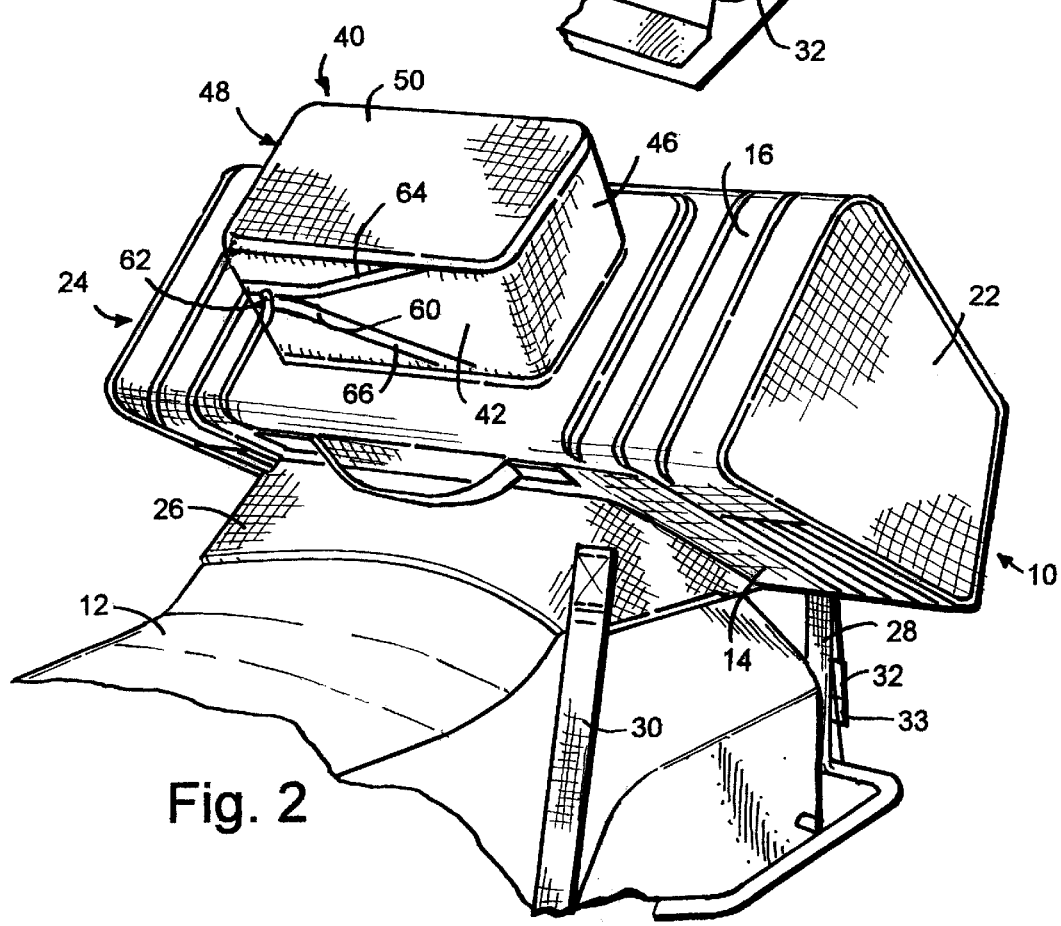
FIG. 2 is a front perspective view of the snowmobile trunk bag shown in FIG. 1, with the collapsible beverage compartment fully deployed to allow storage of beverages.

Shown in FIG. 1 is a snowmobile trunk bag 10 secured to a rearward portion of a snowmobile 12. Referring to FIGS. 1 and 2, snowmobile trunk bag 10 includes a forwardly and downwardly facing bottom panel 14, a forwardly and upwardly facing top panel 16, a rearwardly and upwardly facing top panel 18, a rearwardly and downwardly facing bottom panel 20, a left side panel 22, and a right side panel 24. Panels 16, 18, 20, 22 and 24 define an enclosed storage space for carrying various items which a snowmobiler may need during a snowmobile trip. Secured to forwardly and downwardly facing bottom panel 14 is a position retainer 26 which is fitted to conform to the shape of a rearward hump portion of the snowmobile seat. Position retainer 26 allows snowmobile trunk bag 10 to be properly positioned and retained while snowmobile trunk bag 10 is being secured to snowmobile 12. Position retainer 26 also helps prevent snowmobile bag 10 from shifting during operation of the snowmobile after snowmobile trunk bag 10 has been installed on snowmobile 12. Snowmobile bag 10 is secured to snowmobile 12 in a conventional manner using rear straps 28, 29 and front straps 30 (only one of which is shown). In the illustrated embodiment, straps 28, 29 and 30 are provided with quick-connect buckle connectors 32 which mate with a complementary connector 33 fixed to snowmobile 12.

Snowmobile trunk bag 10 includes an access panel or door 34 which can be opened and closed as desired using zipper 36.

Figure 3:
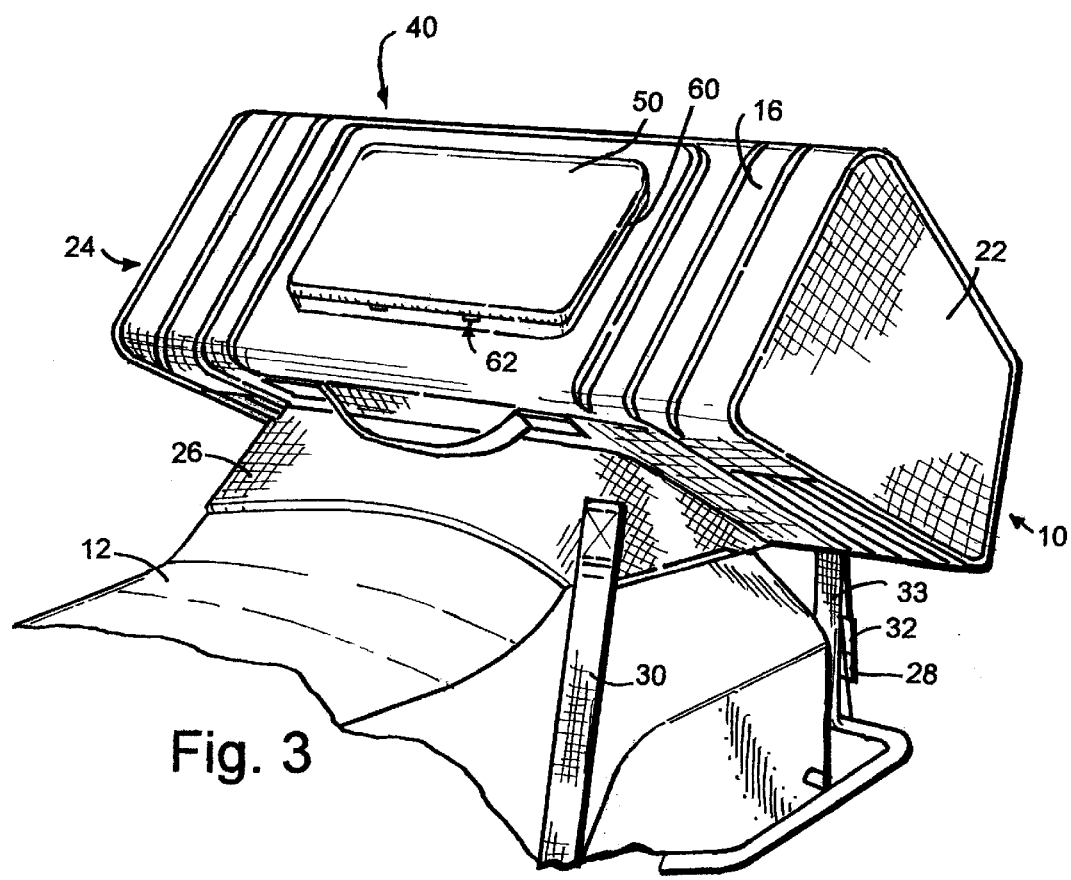
FIG. 3 is a front perspective view of the snowmobile trunk bag shown in FIGS. 1 and 2, with the collapsible beverage compartment compressed or collapsed to reduce the bulkiness of the trunk bag and to provide a better appearance when the collapsible beverage compartment is not being used for storing beverages.

Projecting forwardly and upwardly from forwardly and upwardly facing top panel 16 is a collapsible beverage compartment 40. Collapsible beverage compartment 40 is shown in an expanded or deployed configuration in FIGS. 1 and 2. In FIG. 3, collapsible beverage compartment 40 is shown in a collapsed or compressed configuration, wherein the size and bulkiness of snowmobile trunk bag 10 is reduced when beverages are not being stored within collapsible beverage compartment 40. The ability to collapse or compress collapsible beverage compartment 40 enhances the utility and appearance of the bag when beverages are not stored in compressible beverage compartment 40. The thickness of collapsible beverage compartment 40 in the collapsed or compressed configuration is from about 1/10 to about 1/4 of the thickness of collapsible beverage compartment 40 in the expanded or deployed configuration. The thickness of collapsible beverage compartment 40 refers to the distance that collapsible beverage compartment 40 projects upwardly and forwardly away from upwardly and forwardly facing top panel 16.

Collapsible beverage compartment 40 includes collapsible front wall 42, collapsible rear wall 44, collapsible left sidewall 46, and collapsible right sidewall 48. Collapsible walls 42, 44, 46 and 48 may comprise generally any flexible fabric exhibiting suitable strength, water repellency, and resistance to UV degradation. An example of a suitable material is a nylon fabric, such as CORDURA® fabric.

Collapsible fabric walls 42, 44, 46 and 48 may comprise a single strip of fabric or a plurality of individual sections which are stitched together, such as at the edges where adjacent collapsible walls intersect. Collapsible beverage compartment 40 is provided with a lid panel 50, which may be hinged to collapsible front wall 42 as shown in FIG. 1. A zipper 52 is provided to close collapsible beverage compartment 40.

In accordance with an aspect of this invention, collapsible beverage compartment 40 is provided with a foam insert 54. Foam insert 54 defines at least one cylindrical cavity 56 for holding a beverage container 58, e.g., a 12-oz. aluminum can. More preferably, foam insert 54 defines a plurality of cylindrical cavities for holding beverage containers. For example, in the illustrated embodiment, foam insert 54 has five cylindrical cavities 56.

Desirably, foam insert 54 is a compressible foam insert. The advantage of a compressible foam insert 54 is that it can be compressed and therefore can be left within collapsible beverage compartment 40 when collapsible beverage compartment 40 is in a collapsed or compressed configuration as shown in FIG. 3. A suitable compressible foam insert is, for example, a flexible polyurethane foam insert. As an alternative, foam insert 54 may be relatively rigid foam which is removed from collapsible beverage compartment 40 when collapsible beverage compartment 40 is in the collapsed or compressed configuration shown in FIG. 3. In this case, insert 54 may, for example, be stored within the enclosed space defined by snowmobile trunk bag 10 when it is desired to have collapsible beverage compartment 40 in the collapsed or compressed configuration as shown in FIG. 3.

Collapsible beverage compartment 40 includes a zipper 60 including a sliding tab 62 which can be slid from the position shown in FIG. 2 toward the right (toward the left sidewall 46) to draw upper tooth row 64 and lower tooth row 66 together into an interlocked relationship, whereby lid 50 is drawn toward panel 16. Zipper 60 extends all the way around the perimeter of collapsible beverage compartment 40 so that beverage compartment 40 can be held on all sides in a collapsed or compressed configuration as shown in FIG. 3. In order to facilitate reconfiguration of collapsible beverage compartment 40 from the expanded or deployed configuration to the collapsed or compressed configuration it may be desirable to simultaneously push on lid 50 while sliding tab 62 around the perimeter of collapsible beverage compartment 40, especially when a compressible foam insert is left within collapsible beverage compartment 40.

When a compressible foam insert 54 is left within compressible beverage compartment 40 with beverage compartment 40 in the collapsed or compressed configuration as shown in FIG. 3, compressible beverage compartment 40 can be reconfigured to the expanded or deployed configuration shown in FIG. 2 by merely unzipping zipper 60 to allow compressible foam insert 54 to expand and reassume its original, uncompressed shape. This expansion causes compartment 40 to automatically expand to the expanded or deployed configuration shown in FIG. 2.

It will be apparent to those skilled in the art that various modifications to the preferred embodiment of the invention as described herein can be made without departing from the spirit or scope of the invention as defined by the appended claims.

What is claimed is:

1. Luggage for a sports vehicle comprising:
   a bag including a plurality of panels defining an enclosed space; and
   a collapsible beverage compartment projecting from one of the panels of the bag, wherein the bag is a snowmobile trunk bag having a position retainer fitted to conform to the shape of a rearward portion of a snowmobile, and wherein the plurality of panels defining the enclosed space of the bag includes a panel which projects forwardly and rearwardly when the bag is mounted on a snowmobile, and wherein the collapsible beverage compartment projects forwardly and upwardly from the forwardly and upwardly facing panel, whereby the contents of the collapsible beverage compartment may be easily removed without dismounting from the snowmobile.

2. The luggage of claim 1 further comprising at least one strap connected to the bag for securing the bag to a sports vehicle.

3. The luggage of claim 1 further comprising a foam insert disposed within the collapsible beverage compartment, the foam insert defining at least one cylindrical storage space for holding a beverage can.

4. The luggage of claim 3 in which the foam insert is compressible.

5. The luggage of claim 3, wherein the foam insert is compressible and resilient.

6. The luggage of claim 3, wherein the foam insert is a flexible polyurethane foam.

7. The luggage of claim 1, wherein the collapsible beverage compartment includes flexible fabric front, rear, left side, and right sidewalls.

8. The luggage of claim 1, wherein the collapsible beverage compartment includes a zipper comprising an upper row of zipper teeth, a lower row of zipper teeth, and a sliding tab which is movable in a first direction to interlock the lower and upper rows of teeth together to retain the collapsible beverage compartment in a collapsed state, and movable in an opposite direction to disengage the lower and upper rows of teeth to allow the collapsible beverage compartment to be expanded to hold beverages.

9. The luggage of claim 8, wherein the thickness of the collapsible beverage compartment in the collapsed state is from about 1/10 to about 1/4 of the thickness of the collapsible beverage compartment in the expanded state.

10. The luggage of claim 1, wherein the collapsible beverage compartment includes a closable lid panel hinged on one side to a sidewall of the collapsible beverage compartment.

11. Luggage for a sport vehicle comprising:
    a bag including a plurality of panels defining an enclosed space;
    at least one strap connected to the bag for securing the bag to a sport vehicle; and
    a collapsible beverage compartment projecting from one of the panels of the bag, the collapsible beverage compartment including a zipper comprising an upper row of zipper teeth, a lower row zipper teeth, and a sliding tab which is movable in a first direction to interlock the lower and upper rows of teeth together to retain the collapsible beverage compartment in a collapsed state and movable in an opposite direction to disengage the lower and upper rows of teeth to allow the collapsible beverage compartment to be expanded to hold beverages, wherein the collapsible beverage compartment includes a closable lid panel hinged on one side to a sidewall of the collapsible beverage compartment.

12. The luggage of claim 11, wherein the bag is a snowmobile trunk bag having a position retainer fitted to conform to the shape of a rearward portion of a snowmobile, and wherein the plurality of panels defining the enclosed space of the bag includes a panel which projects forwardly and rearwardly when the bag is mounted on a snowmobile, and wherein the collapsible beverage compartment projects forwardly and upwardly from the forwardly and upwardly facing panel, whereby the contents of the collapsible beverage compartment may be easily removed without dismounting from the snowmobile.

13. The luggage of claim 11 further comprising a foam insert disposed within the collapsible beverage compartment, the foam insert defining at least one cylindrical storage space for holding a beverage can.

14. The luggage of claim 13, wherein the foam insert is compressible.

15. The luggage of claim 13, wherein the foam insert is compressible and resilient.

16. The luggage of claim 13, wherein the foam insert comprising a flexible polyurethane foam.

17. The luggage of claim 13, wherein the collapsible beverage compartment includes flexible fabric front, back, left side, and right sidewalls.

18. The luggage of claim 17, wherein the collapsible beverage compartment includes a closable lid panel hinged on one side to a sidewall of the collapsible beverage compartment.

* * * * *

UNITED STATES PATENT AND TRADEMARK OFFICE
CERTIFICATE OF CORRECTION

PATENT NO. : 6,179,182 B1
DATED : January 30, 2001
INVENTOR(S) : Christopher J. Hayes Page 1 of 1

It is certified that error appears in the above-identified patent and that said Letters Patent is hereby corrected as shown below:

<u>Item [57], Abstract,</u>
Line 6, "esthetic" should be -- aesthetic --.

<u>Column 1,</u>
Line 53, "esthetically" should be -- aesthetically --.

<u>Column 4, claim 11,</u>
Line 55, after "row" insert -- of --.

Signed and Sealed this

Thirteenth Day of November, 2001

Attest:

*Attesting Officer*

NICHOLAS P. GODICI
*Acting Director of the United States Patent and Trademark Office*